United States Patent [19]

Okumoto

[11] Patent Number: 4,534,750
[45] Date of Patent: Aug. 13, 1985

[54] AUTOMOTIVE V-BELT

[75] Inventor: Shigeki Okumoto, Himeji, Japan

[73] Assignee: Mitsubishi Denki Kabushiki Kaisha, Tokyo, Japan

[21] Appl. No.: 413,721

[22] Filed: Sep. 1, 1982

[30] Foreign Application Priority Data

Sep. 12, 1981 [JP] Japan .......................... 56-135694[U]

[51] Int. Cl.³ .............................................. F16G 5/06
[52] U.S. Cl. .................... 474/261; 474/262; 474/265; 474/268; 156/139
[58] Field of Search .............. 474/260, 261, 262, 264, 474/265, 268; 156/137, 139

[56] References Cited

U.S. PATENT DOCUMENTS

| 2,004,479 | 6/1935 | Merrill | 474/261 |
| 2,640,366 | 6/1953 | Knuth | 474/268 |
| 3,880,274 | 4/1975 | Bechtloff et al. | 198/846 |
| 4,010,655 | 3/1977 | Pollard | 474/268 |
| 4,076,550 | 2/1978 | Thurn et al. | 106/288 Q |
| 4,376,667 | 3/1983 | Beckman | 264/343 |
| 4,449,627 | 5/1984 | Kell | 198/847 |
| 4,470,500 | 9/1984 | Howerton | 198/847 |

FOREIGN PATENT DOCUMENTS 195946 12/1982 Japan ................................. 474/268

Primary Examiner—Stephen J. Novosad
Assistant Examiner—M. Goodwin
Attorney, Agent, or Firm—Wenderoth, Lind & Ponack

[57] ABSTRACT

An automotive V-belt used for power transmission to drive accessory units to an automotive internal combustion engine. Surface smoothing agent such as wax is dispersed in the inner material of the belt for reducing attachment of dust to the belt surface.

4 Claims, 4 Drawing Figures

AUTOMOTIVE V-BELT

BACKGROUND OF THE INVENTION

This invention relates to a V-belt used for power transmission to drive accessory units to an automotive internal combustion engine.

FIG. 1 shows a prior art arrangement in which a V-belt to which the invention pertains is used. This arrangement shows a crankshaft pulley 1a for taking out power from an engine 1b, a drive pulley 2a of an automotive generator 2b for charging a battery (not shown) and driving automotive electric units such as lamps and horns, a drive pulley 3a of an engine cooling water circulating pump or a cooling fan 3b, and a V-belt 4. The V-belt 4 serves to transmit the engine power through the crankshaft pulley 1a to the fan and generator.

The automotive V-belt is used under different working conditions from those for the general industrial belts. More particularly, automotive V-belts run at higher speeds and bear higher loads. Further, pulleys are installed in narrow spaces and therefore have small diameters, so that the angles of contact between belt and pulley are small. Further, they are used in severe environments in view of high temperature, dust and vibrations. Therefore, they are subject to extreme elongation and other deformations, which is undesired from the standpoint of their useful life. Particularly, attachment of dust to the belt does not only curtail belt life, but also promotes wear of the pulleys of the accessory units.

FIGS. 2 and 3 show prior art examples of V-belts of this kind. The example of FIG. 2 comprises a cover cloth 5, a rubber layer 6 which takes up tensile force applied to the belt, reinforcing members 7 for preventing elongation of the belt, a rubber layer 8 in which the reinforcing members are buried and a rubber layer 9 which takes up compressive force applied to the belt. The example of FIG. 3 comprises a top cloth 10, rubber layers 8 and 9, ropes 11 used as reinforcing members and a reinforcement bottom cover 12.

As shown, the prior art V-belts use a cover cloth which covers either the entire periphery or only the top of the belt. In either case, a tension necessary for power transmission is given. These V-belts are used in very severe conditions, and their sides are worn extremely due to slip, bending, side pressure and heat generation, so that their useful life is short. In addition, dust is liable to be attached to them, adversely affecting the pulleys of accessory units.

SUMMARY OF THE INVENTION

This invention is intended to preclude the drawbacks discussed above in the prior art, and it seeks to provide a V-belt, in which wax or the like is dispersed in a main material rubber layer, thereby reducing attachment of dust, wear of sides and heat generation to greatly extend the belt life and also greatly reduce wear of pulleys of accessory units.

BRIEF DESCRIPTION OF THE DRAWINGS

In the Figures like reference numerals designate like parts.

DESCRIPTION OF THE PREFERRED EMBODIMENT

Figure 1:
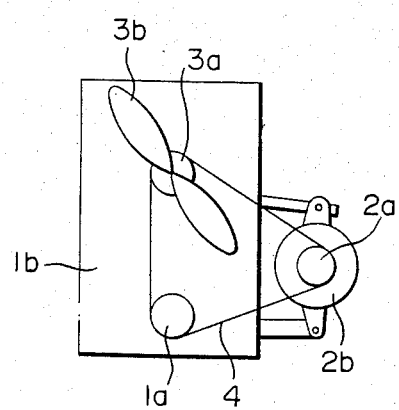
FIG. 1 is a schematic view showing a power transmission system for an automotive internal combustion engine.
Figure 2:
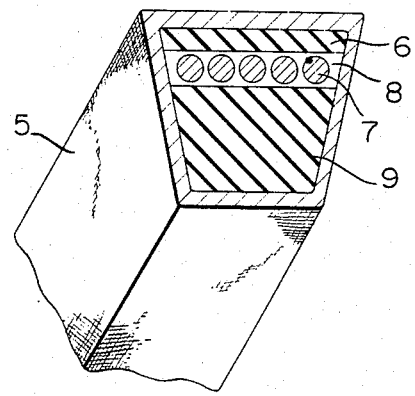
FIGS. 2 and 3 are fragmentary perspective views showing prior art V-belts.
Figure 3:
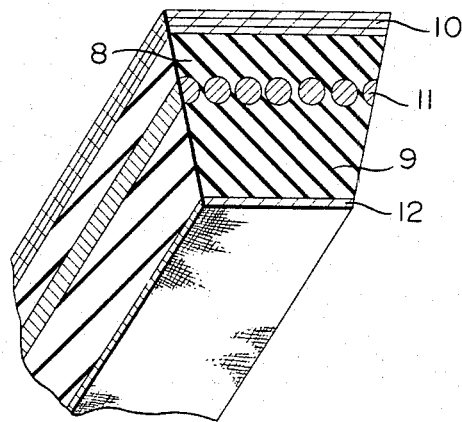
Figure 4:
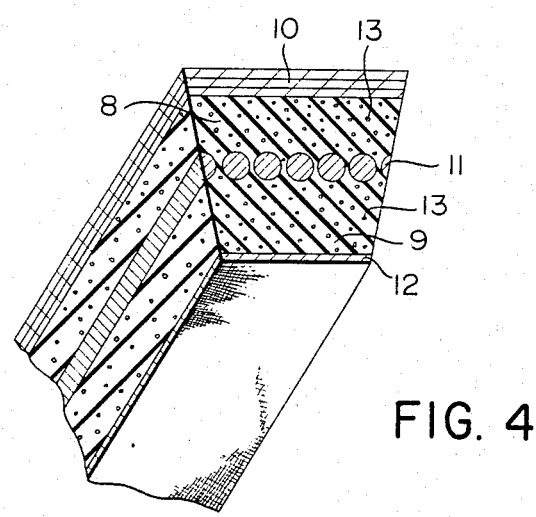
FIG. 4 is a fragmentary perspective view showing an embodiment of the invention.

Now, an embodiment of the invention will be described. As shown in FIG. 4, a V-belt according to the invention comprises a rubber layer 8 as a main body of the belt, a rubber layer 9 which takes up compressive force applied to the belt, a top cover cloth 10, ropes 11 buried in the rubber layer 8 to prevent elongation of the belt, a reinforcement bottom cloth 12, and wax 13. The wax 13 is dispersed throughout rubber layer 8 and compressed rubber layer 9. The wax 13 can serve as a surface smoothing agent as will be described hereinafter.

When the prior art automotive V-belt is used in severe environments, attachment of dust promotes the attachment of oil and water drops to curtail the life of the belt and also promote the wear of accessory unit pulleys. According to the invention, since wax is dispersed in the inner material of the belt, the fit with the drive pulley can be improved to reduce the internal stress generated when power is transmitted. Besides, the wax provides for an action of spattering oil or water drops as soon as they attach to the belt. Thus, the attachment of dust which has adverse effects on the belt life can be reduced and also the wear-proof property of the transmission system pulleys can be improved.

While in the above embodiment wax has been used as the dispersant, it is also possible to use an organic compound such as polyurethane. In this case, the wear-proof property can be further improved.

As has been described in the foregoing, according to the invention, by dispersing wax in the rubber as the main material of the belt, it is possible to improve the fit of the belt in the drive pulley, reduce internal stress generated when power is transmitted, and reduce attachment of dust to the belt to extend the life of the belt and reduce wear of the transmission system pulleys.

What is claimed is:

1. An automotive V-belt useful for power transmission to drive accessory units to an automotive internal combustion engine, in which the inner material of the belt consists of rubber, an elongation-inhibiting member embedded in the rubber, and a surface smoothing agent for reducing attachment of dust to the belt surface dispersed throughout the cross-section of the rubber.

2. The automotive V-belt according to claim 1, wherein said surface smoothing agent is wax.

3. The automotive V-belt according to claim 1, wherein said surface smoothing agent is an organic compound.

4. The automotive V-belt according to claim 1, wherein said surface smoothing agent is polyurethane.

* * * * *